United States Patent
Tsai

(10) Patent No.: US 7,766,639 B2
(45) Date of Patent: Aug. 3, 2010

(54) FORMING DIE FOR FORMING A HEAD ON A ROPE

(76) Inventor: Dao-Long Tsai, 49-3, Wan Nien Lane, Min Sheng Li, Yuan Lin Chen, Changhua County (TW)

( * ) Notice: Subject to any disclaimer, the term of this patent is extended or adjusted under 35 U.S.C. 154(b) by 226 days.

(21) Appl. No.: 11/970,840

(22) Filed: Jan. 8, 2008

(65) Prior Publication Data

US 2008/0311238 A1 Dec. 18, 2008

(30) Foreign Application Priority Data

Jun. 15, 2007 (TW) .............................. 96209979 U

(51) Int. Cl.
*B29C 43/20* (2006.01)
(52) U.S. Cl. .................. 425/108; 156/502; 425/120; 425/121; 425/127; 425/293; 425/505
(58) Field of Classification Search ................ 425/108, 425/120, 121, 127, 505, 293, 289; 156/502
See application file for complete search history.

(56) References Cited

U.S. PATENT DOCUMENTS 1,583,166 A * 5/1926 Pawlas ....................... 425/112

\* cited by examiner

*Primary Examiner*—Tim Heitbrink
(74) *Attorney, Agent, or Firm*—Alan Kamrath; Kamrath & Associates PA

(57) ABSTRACT

A forming die for forming a head on a rope includes a first die block provided with a first die cavity which is provided with at least one first clamping rib, and a second die block provided with a second die cavity which is provided with at least one second clamping rib. Thus, the second clamping rib of the second die block is movable to abut the respective first clamping rib of the first die block to form an annular clamping rib which presses the head of the rope to form an annular clamping groove in a peripheral wall of the head so that the head is fixed on the rope closely by compression of the annular clamping groove to prevent the head from being detached from the rope due to a larger pulling force.

8 Claims, 6 Drawing Sheets

FORMING DIE FOR FORMING A HEAD ON A ROPE

BACKGROUND OF THE INVENTION

1. Field of the Invention

The present invention relates to a forming die and, more particularly, to a forming die for forming a head on a rope.

2. Description of the Related Art

A rope has two opposite ends each provided with a head made of a flexible sheet plate. The head has an annular shape and is enclosed around the peripheral wall of each of the two opposite ends of the rope so that each of the two opposite ends of the rope is clamped and bound by the head. However, the head is mounted on each of the two opposite ends of the rope by bonding or coating so that the head is easily detached from each of the two opposite ends of the rope due to a larger pulling force.

BRIEF SUMMARY OF THE INVENTION

In accordance with the present invention, there is provided a forming die for forming a head on a rope, comprising a support base, a first die block mounted on the support base and having a side provided with a first die cavity which is provided with at least one first clamping rib, and a second die block movably mounted on the support base and having a side provided with a second die cavity which is provided with at least one second clamping rib aligning with the first clamping rib of the first die cavity of the first die block.

The primary objective of the present invention is to provide a forming die for forming a head on a rope, wherein the head is combined with the rope solidly and tightly without incurring detachment between the head and the rope.

Another objective of the present invention is to provide a forming die for forming a head on a rope, wherein each of the second clamping ribs of the second die block is movable to abut the respective first clamping rib of the first die cavity of the first die block to form an annular clamping rib which presses the head of the rope so as to form an annular clamping groove in a peripheral wall of the head of the rope so that the head is fixed on the rope closely by compression of the annular clamping groove to prevent the head from being detached from the rope due to a larger pulling force.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
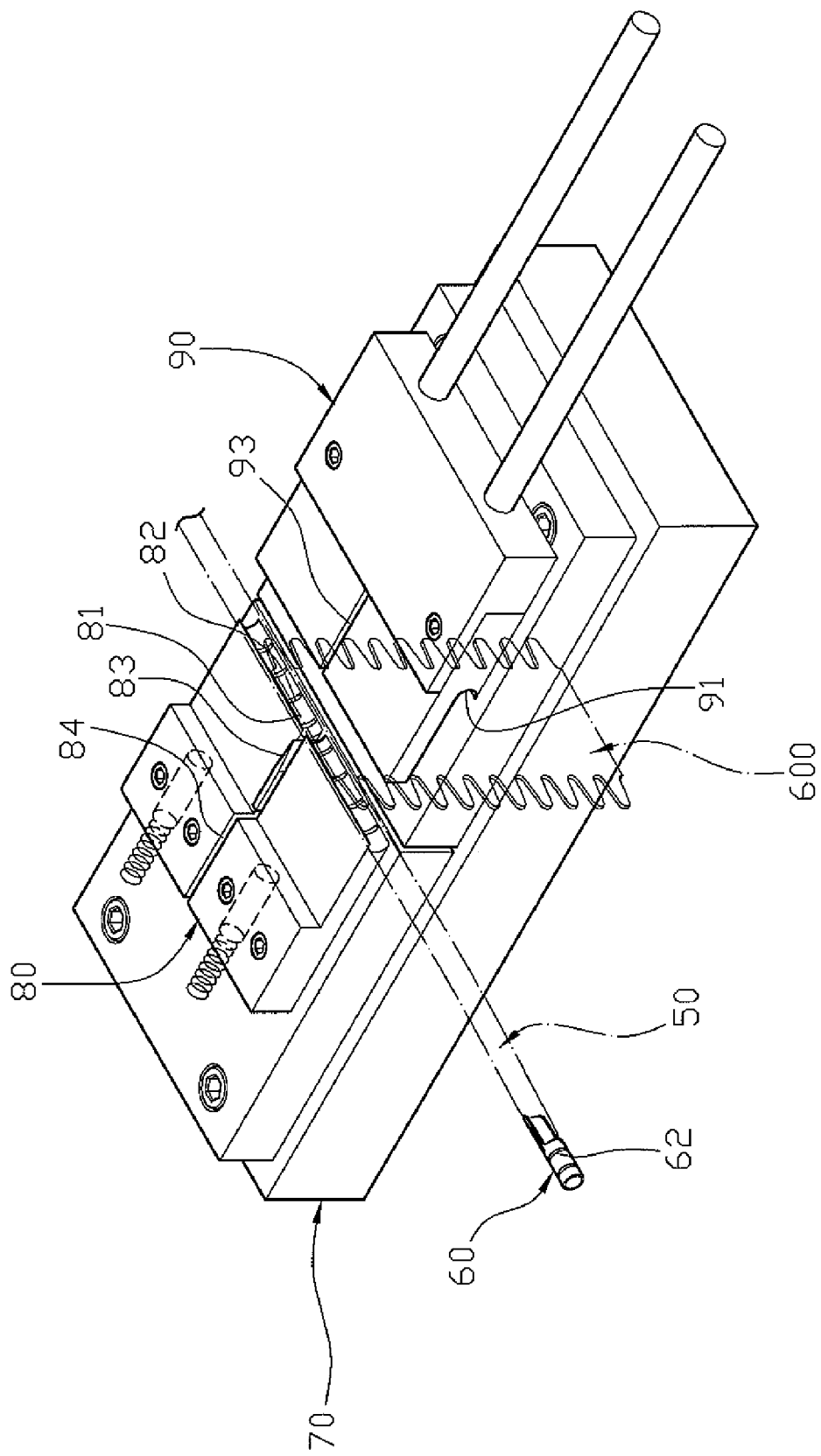
FIG. 1 is a perspective view of a forming die for forming a head on a rope in accordance with the preferred embodiment of the present invention.
Figure 2:
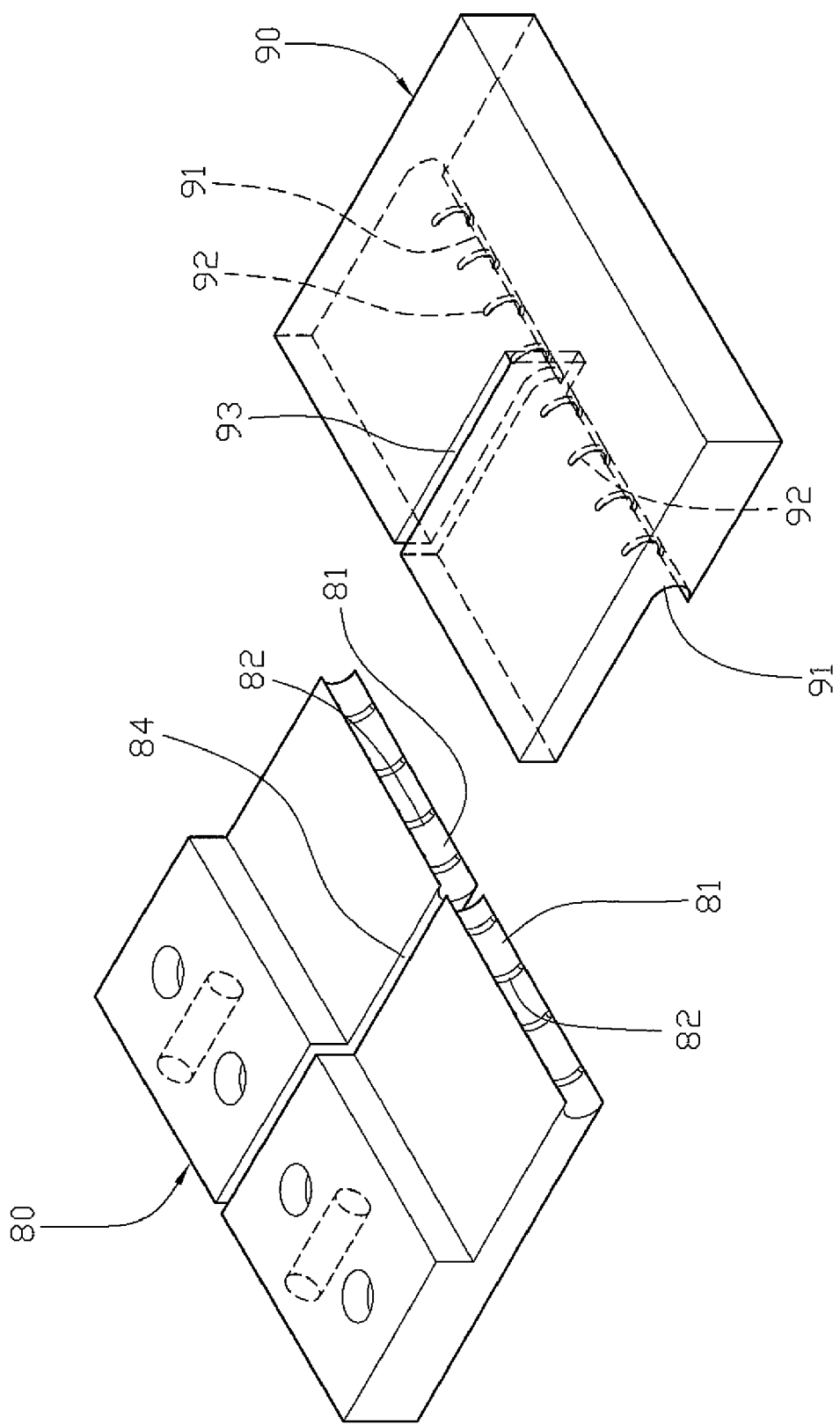
FIG. 2 is a partially exploded perspective view of the forming die for forming a head on a rope as shown in FIG. 1.
Figure 3:
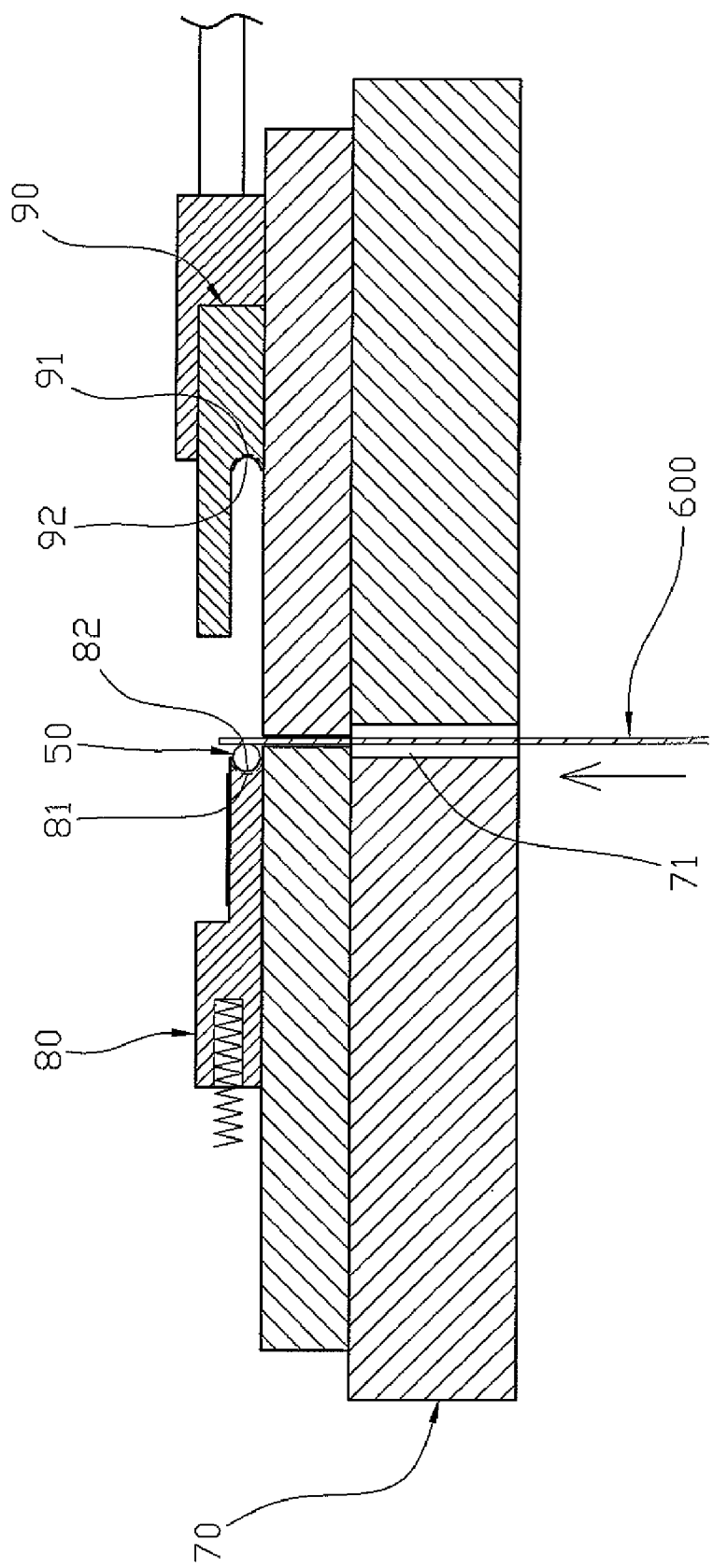
FIG. 3 is a front cross-sectional view of the forming die for forming a head on a rope as shown in FIG. 1.

Referring to the drawings and initially to FIGS. 1-3, a forming die for forming a head on a rope in accordance with the preferred embodiment of the present invention comprises a support base 70, a first die block 80 mounted on the support base 70 and having a side provided with a first die cavity 81 which is provided with at least one first clamping rib 82, and a second die block 90 movably mounted on the support base 70 and having a side provided with a second die cavity 91 which is provided with at least one second clamping rib 92 aligning with the first clamping rib 82 of the first die cavity 81 of the first die block 80.

The first die cavity 81 of the first die block 80 has a substantially semi-circular cross-sectional profile and is provided with a plurality of first clamping ribs 82. Each of the first clamping ribs 82 of the first die block 80 has a substantially semi-annular cross-sectional profile and protrudes radially and outwardly from a peripheral wall of the first die cavity 81.

The second die block 90 is movable to abut the first die block 80. The second die cavity 91 of the second die block 90 has a substantially semi-circular cross-sectional profile and is movable to abut the first die cavity 81 of the first die block 80 to form a circular die cavity to receive a rope 50 and a flexible sheet plate 600. The second die cavity 91 of the second die block 90 is provided with a plurality of second clamping ribs 92. Each of the second clamping ribs 92 of the second die block 90 has a substantially semi-annular cross-sectional profile and protrudes radially and outwardly from a peripheral wall of the second die cavity 91. Each of the second clamping ribs 92 of the second die block 90 is movable to abut the respective first clamping rib 82 of the first die block 80 to form an annular clamping rib.

The forming die further comprises a cutter 83 movable between the first die block 80 and the second die block 90 to traverse the first die cavity 81 of the first die block 80 and the second die cavity 91 of the second die block 90. The first die block 80 is provided with a first guide channel 84 traversing the first die cavity 81 to guide movement of the cutter 83, and the second die block 90 is provided with a second guide channel 93 traversing the second die cavity 91 of the second die block 90 and aligning with the first guide channel 84 of the first die block 80 to guide movement of the cutter 83.

The support base 70 is provided with a passage 71 to allow passage of the flexible sheet plate 600 which is located between the first die cavity 81 of the first die block 80 and the second die cavity 91 of the second die block 90.

Figure 4:
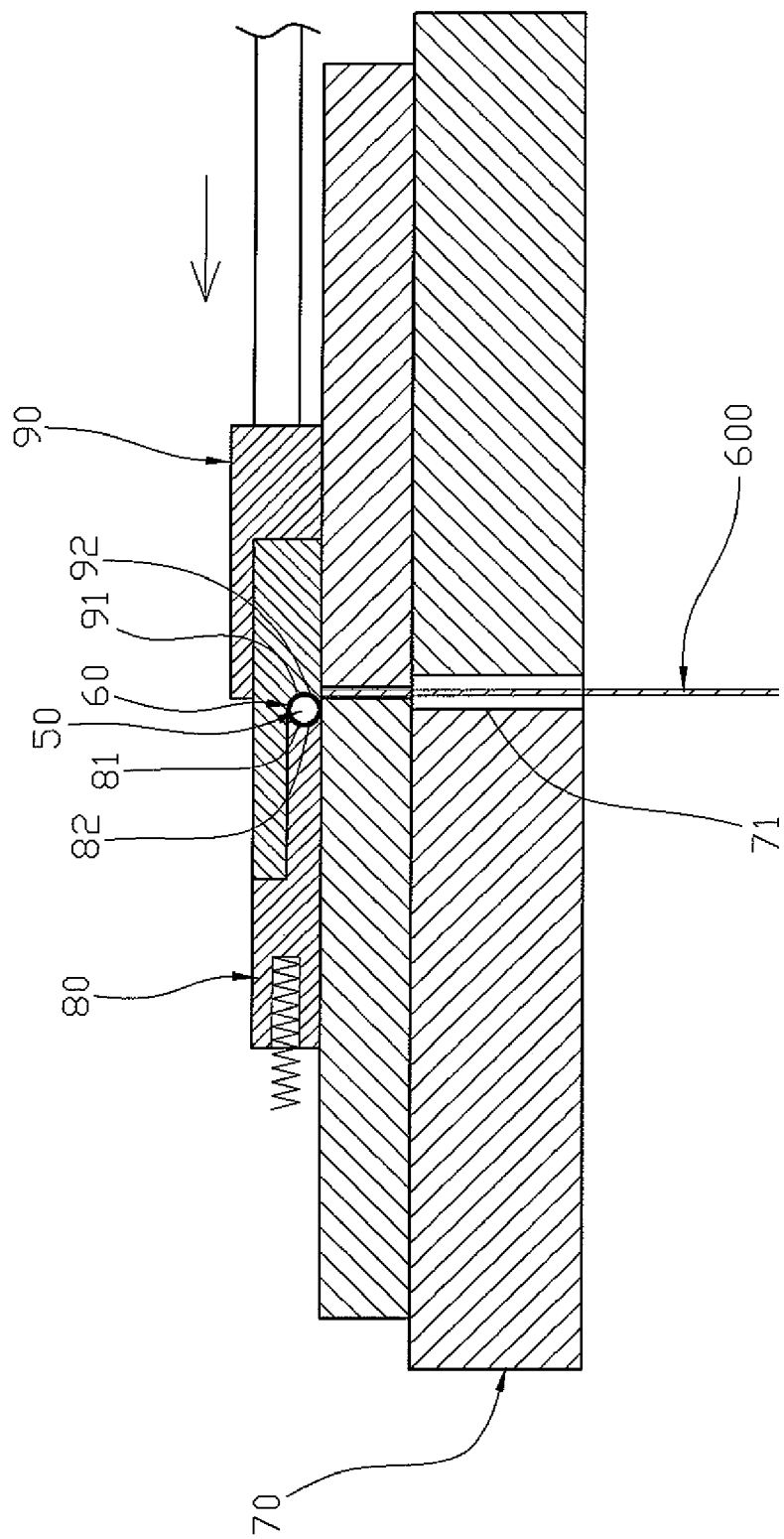
FIG. 4 is a schematic operational view of the forming die for forming a head on a rope as shown in FIG. 1.
Figure 5:
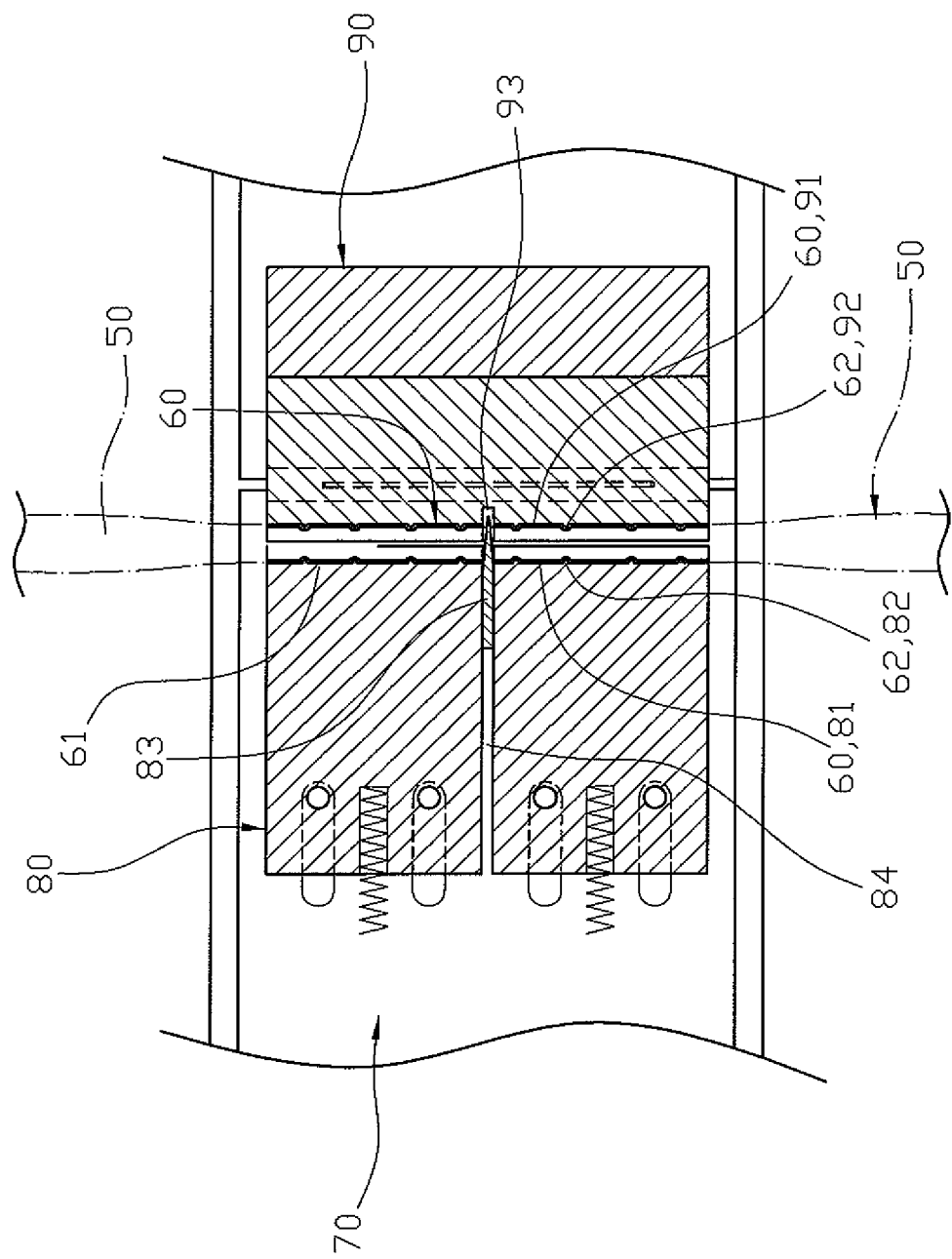
FIG. 5 is a top cross-sectional view of the forming die for forming a head on a rope as shown in FIG. 4.
Figure 6:
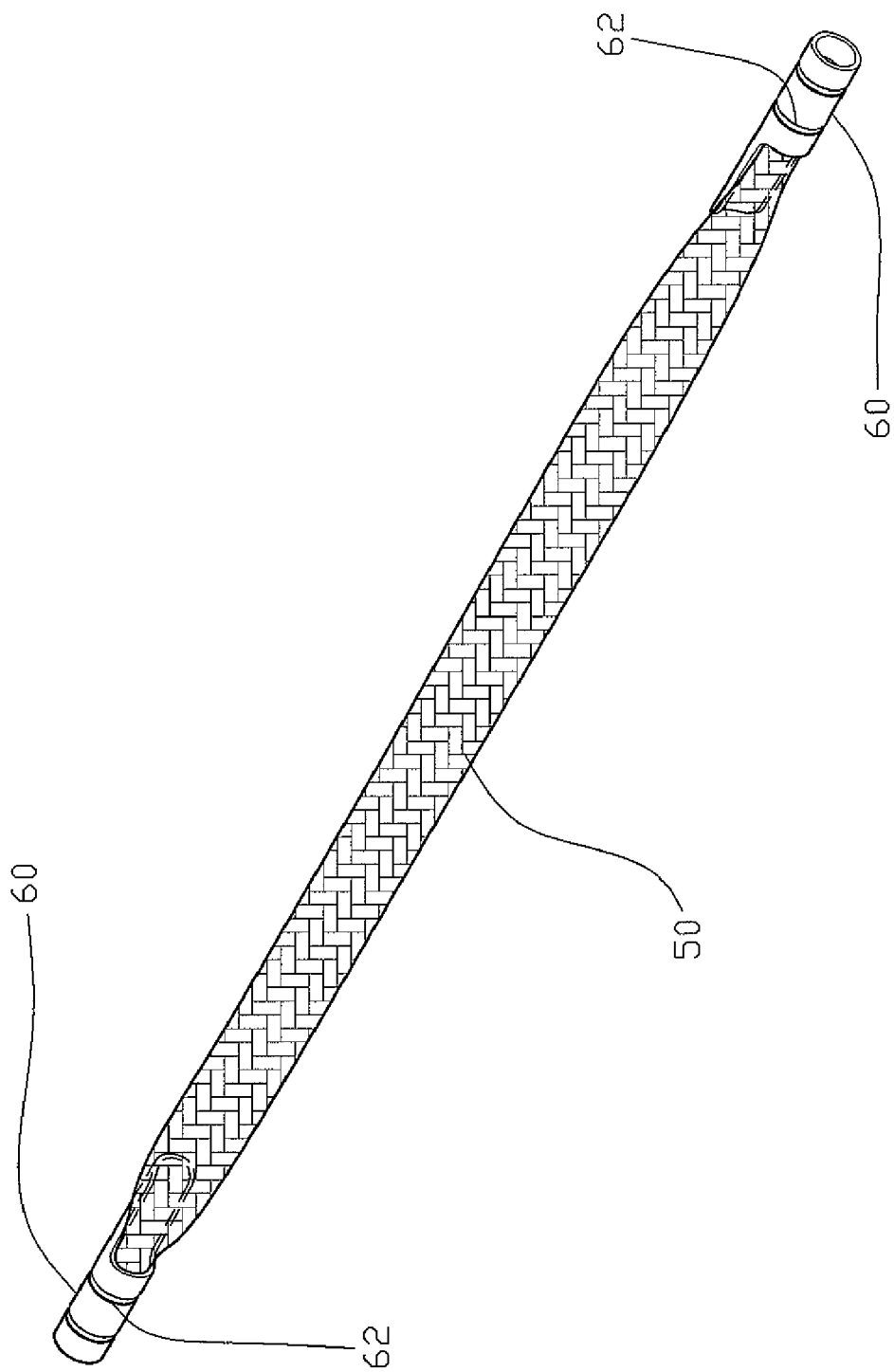
FIG. 6 is a perspective view of a head formed on a rope by the forming die as shown in FIG. 1.

In operation, referring to FIGS. 3-6 with reference to FIGS. 1 and 2, the rope 50 is initially received in the first die cavity 81 of the first die block 80, and the sheet plate 600 has an upper end enclosed around a periphery of the rope 50 as shown in FIG. 3. At this time, the sheet plate 600 has a surface coated with an adhesive to bond the sheet plate 600 onto the rope 50. Then, the second die block 90 is movable to abut the first die block 80 as shown in FIGS. 4 and 5 to clamp the rope 50 and the upper end of the sheet plate 600 between the first die cavity 81 of the first die block 80 and the second die cavity 91 of the second die block 90 so that the upper end of the sheet plate 600 forms a head 60 on the rope 50 by pressing of the first die cavity 81 of the first die block 80 and the second die cavity 91 of the second die block 90. At this time, each of the second clamping ribs 92 of the second die block 90 is movable to abut the respective first clamping rib 82 of the first die block 80 to form an annular clamping rib which presses the head 60 of the rope 50 so as to form an annular clamping groove 62 in a peripheral wall of the head 60 of the rope 50 so that the head 60 is fixed on the rope 50 closely by compression of the annular clamping groove 62 to prevent the head 60 from being detached from the rope 50 due to a larger pulling force. Then, the cutter 83 is movable to traverse the first die cavity 81 of the first die block 80 and the second die cavity 91 of the second die block 90 and to cut the head 60 of the rope 50. The above-mentioned procedures are repeated again and again so as to form a plurality of ropes 50 as shown in FIG. 6 each having two ends each provided with a head 60 which has a plurality of annular clamping grooves 62.

Accordingly, each of the second clamping ribs 92 of the second die block 90 is movable to abut the respective first clamping rib 82 of the first die cavity 81 of the first die block 80 to form an annular clamping rib which presses the head 60 of the rope 50 so as to form an annular clamping groove 62 in a peripheral wall of the head 60 of the rope 50 so that the head 60 is fixed on the rope 50 closely by compression of the annular clamping groove 62 to prevent the head 60 from being detached from the rope 50 due to a larger pulling force.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

The invention claimed is:

1. A forming die for forming a head on a rope, comprising:
a support base;
a first die block mounted on the support base and having a side provided with a first die cavity which is provided with at least one first clamping rib;
a second die block movably mounted on the support base and having a side provided with a second die cavity which is provided with at least one second clamping rib aligning with the first clamping rib of the first die cavity of the first die block;
a cutter movable between the first die block and the second die block to traverse the first die cavity of the first die block and the second die cavity of the second die block.

2. The forming die in accordance with claim 1, wherein
the first die cavity of the first die block is provided with a plurality of first clamping ribs;
the second die cavity of the second die block is provided with a plurality of second clamping ribs.

3. The forming die in accordance with claim 2, wherein
each of the first clamping ribs of the first die block has a substantially semi-annular cross-sectional profile and protrudes radially and outwardly from a peripheral wall of the first die cavity;
each of the second clamping ribs of the second die block has a substantially semi-annular cross-sectional profile and protrudes radially and outwardly from a peripheral wall of the second die cavity.

4. The forming die in accordance with claim 3, wherein
each of the second clamping ribs of the second die block is movable to abut the respective first clamping rib of the first die block to form an annular clamping rib.

5. The forming die in accordance with claim 3, wherein
the first die cavity of the first die block has a substantially semi-circular cross-sectional profile;
the second die cavity of the second die block has a substantially semi-circular cross-sectional profile;
the second die cavity of the second die block is movable to abut the first die cavity of the first die block to form a circular die cavity to receive a rope and a flexible sheet plate.

6. The forming die in accordance with claim 5, wherein
the rope is received in the first die cavity of the first die block;
the sheet plate has an upper end enclosed around a periphery of the rope;
the second die block is movable to abut the first die block to clamp the rope and the upper end of the sheet plate between the first die cavity of the first die block and the second die cavity of the second die block so that the upper end of the sheet plate forms a head on the rope by pressing of the first die cavity of the first die block and the second die cavity of the second die block;
each of the second clamping ribs of the second die block is movable to abut the respective first clamping rib of the first die block to form an annular clamping rib which presses the head of the rope so as to form an annular clamping groove in a peripheral wall of the head of the rope so that the head is fixed on the rope closely by compression of the annular clamping groove.

7. The forming die in accordance with claim 1, wherein
the first die block is provided with a first guide channel traversing the first die cavity to guide movement of the cutter;
the second die block is provided with a second guide channel traversing the second die cavity of the second die block and aligning with the first guide channel of the first die block to guide movement of the cutter.

8. A forming die for forming a head on a rope, comprising:
a support base;
a first die block mounted on the support base and having a side provided with a first die cavity which is provided with at least one first clamping rib;
a second die block movably mounted on the support base and having a side provided with a second die cavity which is provided with at least one second clamping rib aligning with the first clamping rib of the first die cavity of the first die block;
wherein the first die cavity of the first die block is provided with a plurality of first clamping ribs;
the second die cavity of the second die block is provided with a plurality of second clamping ribs;
each of the first clamping ribs of the first die block has a substantially semi-annular cross-sectional profile and protrudes radially and outwardly from a peripheral wall of the first die cavity;
each of the second clamping ribs of the second die block has a substantially semi-annular cross-sectional profile and protrudes radially and outwardly from a peripheral wall of the second die cavity;
the first die cavity of the first die block has a substantially semi-circular cross-sectional profile;
the second die cavity of the second die block has a substantially semi-circular cross-sectional profile;
the second die cavity of the second die block is movable to abut the first die cavity of the first die block to form a circular die cavity to receive a rope and a flexible sheet plate;
the support base is provided with a passage to allow passage of the flexible sheet plate which is located between the first die cavity of the first die block and the second die cavity of the second die block.

* * * * *